`US011830684B2`

(12) United States Patent
Gordon

(10) Patent No.: US 11,830,684 B2
(45) Date of Patent: Nov. 28, 2023

(54) MAGNETICALLY PRELOADED PUSH BUTTON

(71) Applicant: Microsoft Technology Licensing, LLC, Redmond, WA (US)

(72) Inventor: Michael Cameron Gordon, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/711,186

(22) Filed: Apr. 1, 2022

(65) Prior Publication Data
US 2023/0317385 A1 Oct. 5, 2023

(51) Int. Cl.
| H01H 13/14 | (2006.01) |
| H01H 13/20 | (2006.01) |
| G06F 1/16 | (2006.01) |
| H01H 13/04 | (2006.01) |

(52) U.S. Cl.
CPC .......... *H01H 13/14* (2013.01); *G06F 1/1626* (2013.01); *G06F 1/1656* (2013.01); *H01H 13/04* (2013.01); *H01H 13/20* (2013.01)

(58) Field of Classification Search
CPC ........ H01H 13/14; H01H 13/04; H01H 13/20; H01H 36/004; H01H 36/0073; H01H 2036/0093; H01H 2221/04; G06F 1/1626; G06F 1/1656; G06F 1/16
See application file for complete search history.

(56) References Cited

U.S. PATENT DOCUMENTS

| 3,815,066 | A | | 6/1974 | Vinal |
| 4,354,081 | A | * | 10/1982 | Serras-Paulet ........... H01H 5/02 |
| | | | | 200/345 |
| 5,228,561 | A | | 7/1993 | Schroeder et al. |
| 9,489,810 | B2 | | 11/2016 | Tissot |
| 9,508,503 | B2 | | 11/2016 | Gordon |
| 9,685,286 | B2 | * | 6/2017 | Kimura ................ H01H 13/705 |
| 10,691,211 | B2 | | 6/2020 | Amin-shahidi et al. |
| 2008/0264770 | A1 | | 10/2008 | Purcocks |
| 2015/0034470 | A1 | | 2/2015 | Kimura et al. |
| 2015/0194277 | A1 | | 7/2015 | Bokma et al. |
| 2016/0042897 | A1 | | 2/2016 | Qian |
| 2021/0278946 | A1 | | 9/2021 | Rosenberg et al. |
| 2021/0327660 | A1 | | 10/2021 | Wang |

FOREIGN PATENT DOCUMENTS

WO 2020087375 A1 5/2020

OTHER PUBLICATIONS

"Teardown—3D-Printed Magnetic Levitation "Void" Switches!", Retrieved From: https://www.youtube.com/watch?v=H_Ym9528awM, Jul. 13, 2021, 25 Pages.
"International Search Report and Written Opinion Issued in PCT Application No. PCT/US23/010887", dated May 8, 2023, 12 Pages.

* cited by examiner

*Primary Examiner* — Lheiren Mae A Caroc
(74) *Attorney, Agent, or Firm* — Holzer Patel Drennan

(57) ABSTRACT

Push buttons utilizing dome switches are often preloaded to take up any tolerances in the push button design causing a gap and provide consistent tactile feedback to a user. However, conventional push button preload techniques can be costly and difficult to consistently reproduce during push button manufacturing. A new pre-load design does not require pre-depression of the dome switch to close the gap, which permits a more forgiving tolerance to manufacturing variations.

20 Claims, 5 Drawing Sheets

MAGNETICALLY PRELOADED PUSH BUTTON

BACKGROUND

Push buttons for mobile computing devices often utilize dome switches (e.g., metal dome switches and polydomes) due to their compact size, positive tactile feedback, and ability to reliably withstand a large number of depression and release cycles. Consistent tactile feel is important in push button design.

SUMMARY

Implementations described and claimed herein provide a computing device comprising a device chassis including a button aperture and a push button. The push button includes a button cap with a user interface surface on a top side of the button cap, a button post extending from a bottom side of the button cap, the button post extending through the button aperture, a retainer post also extending from the bottom side of the button cap, the retainer post extending through the button aperture, and a ferromagnetic key retainer attached to a distal end of the retainer post that limits travel of the button cap out of the device chassis. The push button further includes a dome switch mounted within the device chassis and a preload magnet that biases the button post against the dome switch by magnetic force with the ferromagnetic key retainer.

Implementations described and claimed herein further provide a computing device comprising a device chassis including a button aperture and a push button. The push button includes a ferromagnetic button cap extending through the button aperture with a user interface surface on a top side of the button cap and a button post extending from a bottom side of the button cap. The push button further includes a dome switch mounted to the device chassis and a preload magnet that biases the button post against the dome switch by magnetic force with the ferromagnetic button cap.

Implementations described and claimed herein still further provide a method of actuating a magnetically preloaded push button comprising preloading a button post against a dome switch using a magnetic force applied by a preload magnet on a ferromagnetic button cap of the push button; receiving an actuation force on a user interface surface on a top side of the ferromagnetic button cap; transmitting the actuation force through the button post extending from a bottom side of the button cap, the button post extending through a button aperture in a device chassis and contacting the dome switch; and depressing the dome switch using the actuation force applied to the dome switch using the button post.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Figures 1A, 1B:
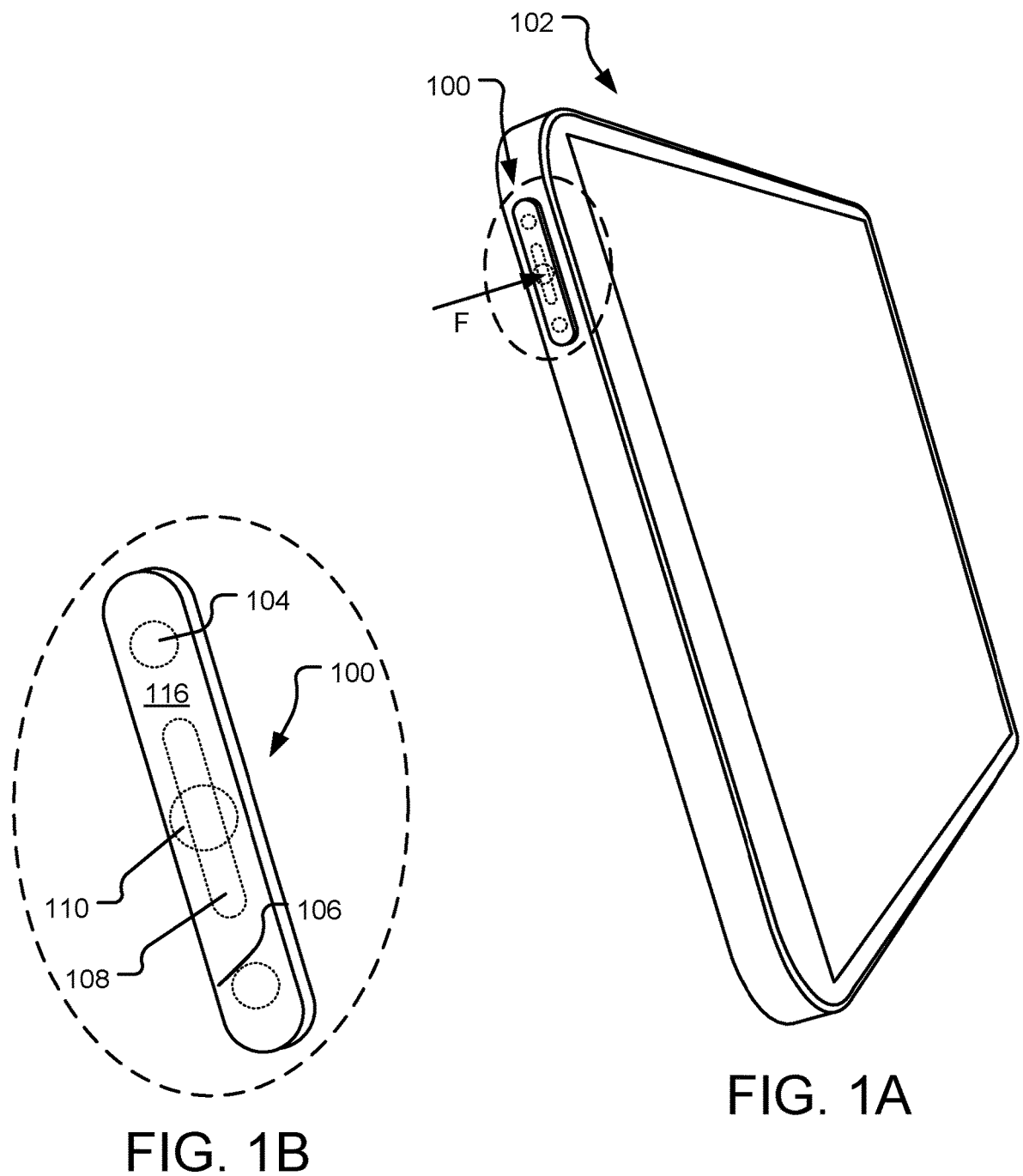
FIG. 1A illustrates a perspective view of an example mobile computing device with a magnetically preloaded push button.
FIG. 1B illustrates a detail perspective view of the example magnetically preloaded push button of FIG. 1A.

Due to mechanical tolerances in various push button designs, a gap typically exists between a switch actuator and a mechanical key plunger of a push button. Absent efforts to address the gap, the push button may rattle in its chassis, which yields an undesirable tactile feel. Push buttons utilizing dome switches are often preloaded to take up any tolerances in the push button design causing the gap and provide consistent tactile feedback to a user. However, conventional push button preload techniques can be costly and difficult to consistently reproduce during push button manufacturing.

Some conventional push button designs utilize a resiliently deflectable material (e.g., a foam or soft elastomer) to take up a gap between a switch actuator and a mechanical key plunger of a push button. However, this solution may be imprecise in its execution, resulting in inconsistent tactile feedback across a product run of push buttons. The resiliently deflectable material may also degrade over time and negatively affect the positive tactile feedback of the underlying dome switch.

Other conventional push button designs utilize an adjustable preload to take up any tolerances in the push button design causing the gap and provide consistent tactile feedback to a user. These designs may utilize sliding brackets that lock in place with a desired preload. However, such adjustable preload designs have higher part counts, and thus higher assembly time and total cost. Further, adjustable preload designs have a greater risk of failure due to the higher part count, greater susceptibility to impact damage, and more costly field repairs due to specialized equipment used to set the adjustable preload at the factory not being present in the field. Still further, adjustable preload designs often have a moveable dome switch bracket to adjust preloaded. Such adjustable dome switch brackets tend to take more space than similar fixed brackets, which is a disadvantage is devices where space is at a premium.

Still other conventional push button designs utilize binning methods to close the gap. For example, by measuring some of the push button mechanism components and picking another component from a selection of bins that vary a critical dimension, the gap can be reduced or eliminated during assembly. However, these designs are higher cost as a singular part becomes multiple customizable parts that must the measured and replaced during assembly. Further, field repairs are more difficult as the binned parts may not be available in the field.

Due to the small stroke (e.g., 0.15 mm) of many dome switches, conventional preload designs are dimensionally sensitive and often require higher component dimensional accuracy and assembly precision, which can cause higher failure rates and manufacturing time and cost, as discussed above. In various implementations, the presently disclosed technology employs a new pre-load design without requiring pre-depression of the dome switch to close the gap, which permits a more forgiving tolerance to manufacturing variations. In various implementations, the presently disclosed technology resolves one or more of the disadvantages of the conventional push button designs described above.

The presently disclosed technology is directed to one or more of: improved tactility and reduced key rattle in a computing device chassis, improved tactile switch consistency within the computing device chassis and from unit-to-unit, improved impact survival by omission of a sliding bias bracket, improved water and/or dust ingress protection, simplified assembly and field repair processes, lower space utilization within the computing device chassis, and cost reduction.

FIG. 1A illustrates a perspective view of an example mobile computing device 102 with a magnetically preloaded push button 100. FIG. 1B illustrates a detail perspective view of the example magnetically preloaded push button of FIG. 1A. The push button 100 includes a pair of dome switches 104, 106, each of which are of a metal or rubber type. A metal dome switch is a formed piece of metal (e.g., stainless steel) that, when compressed, give the user a crisp, positive tactile feedback. The metal dome switch may be reliable to over 5 million cycles, and can be plated in either nickel, silver or gold for consistent electrical conductivity and corrosion resistance. A rubber dome switch, referred to herein as a polydome, is a formed polyurethane dome where the inside bubble is coated in graphite for electrical conductivity. While the polydome is cheaper, it lacks the crisp snap, has a larger physical stroke, and has a lower life specification as compared to a typical metal dome. Further, while the polydome is quiet when cycled, it does not provide as much positive response to the user as compared to a typical metal dome.

Arrow F illustrates a depression force applied by a user on the push button 100. For either the metal or the rubber dome switches 104, 106, when the push button 100 is pressed, it collapses the dome switches 104, 106, which connects two underlying circuit traces (not shown) and completes a connection to electrically signify depression of the push button 100. Similarly, when the push button 100 is released, the dome switches 104, 106 rebound, which disconnects the two underlying circuit traces to electrically signify release of the push button 100. The dome switches 104, 106 are centered on opposing sides of the push button 100 but installed behind the push button 100 inside the device 102. Thus, the dome switches 104, 106 are illustrated in broken lines as they are not visible from the exterior of the device 102.

A button cap 116 is retained within a button aperture in the mobile computing device 102 with a key retainer 108, though the button aperture is not explicitly shown. The key retainer 108 may be made of a ferromagnetic material or include a ferromagnetic target affixed thereto. The key retainer 108 is positioned within the device 102 and provides a mechanical limit to how far outside of the aperture the button cap 116 may extend. As such, the key retainer 108 is illustrated in broken lines as it is not visible from the exterior of the device 102. The key retainer 108 is also used to take up a gap between a switch actuator (not shown) and a pair of mechanical key plungers (also not shown), each associated within one of the dome switches 104, 106, of the push button 100. The ferromagnetic retainer 108 is attracted to preload magnet 110 and the magnetic force is tuned to close the gap and apply a desired level of preload force against the dome switches 104, 106. The consistent desired level of preload force is technically advantageous as it is used to close the gap that would otherwise permit the button cap 116 to rattle within the device 102. The consistent desired level of preload force is technically advantageous as it allows for positive tactile feedback to the user to be substantially same over numerous depressions and releases of the push button 100.

More specifically, by closing the gap and applying a consistent desired level of preload force on the dome switches 104, 106, the push button 100 achieves positive tactile feedback for different users applying different levels of force (F) on the push button 100 at different points in time over a life of the device 102. Positive tactile feedback may be measured as substantially same if there is less than a 10% variation in force applied to the push button 100 and stroke of the push button 100 required to actuate the dome switches 104, 106, for example.

While the push button 100 is illustrated as an oblong rounded rectangular shape, in other implementations it may have any other general shape, with or without rounded corners. Further, while the mobile computing device 102 is illustrated as a mobile phone or tablet computer, the push button 100 may be incorporated into any computing device (e.g., tablet computers, a laptop computers, a personal computers, gaming devices, a smart phones, keyboards, mice, or any other discrete device that receives physical user inputs and carries out one or more sets of arithmetic and/or logical operations) or input device for a computing device (e.g., handheld controllers, keyboards, trackpads, and mice). Further, the push button 100 may be applied to vehicles (e.g., automobiles, watercraft, and aircraft), consumer electronics (e.g., cameras, telephones, and home appliances), medical devices, and industrial or commercial machinery.

In some implementations, the push button 100 functions as one or both of a power button and a fingerprint reader. Further, the push button 100 may serve other functions, such as a volume adjuster, or selection key. Still further, a computing device or an input device for a computing device may incorporate multiples of the push button 100 (e.g., each key on a keyboard may incorporate the push button 100). Further still, the push button 100 may incorporate a haptic response (e.g., vibration or other repeated forces or motions) to enhance the tactile feedback of the physical travel of the push button 100.

In some implementations, the push button 100 may be covered by a fabric covering (not shown) that serves to seal the interior of the device 102 from contaminates and hide the seam between the device 102 and the push button 100. The fabric covering permits physical depression of the push button 100 and transmits the positive tactile feedback from the push button 100 to the user. The fabric covering may be less than 0.5 mm thick.

Figure 2:
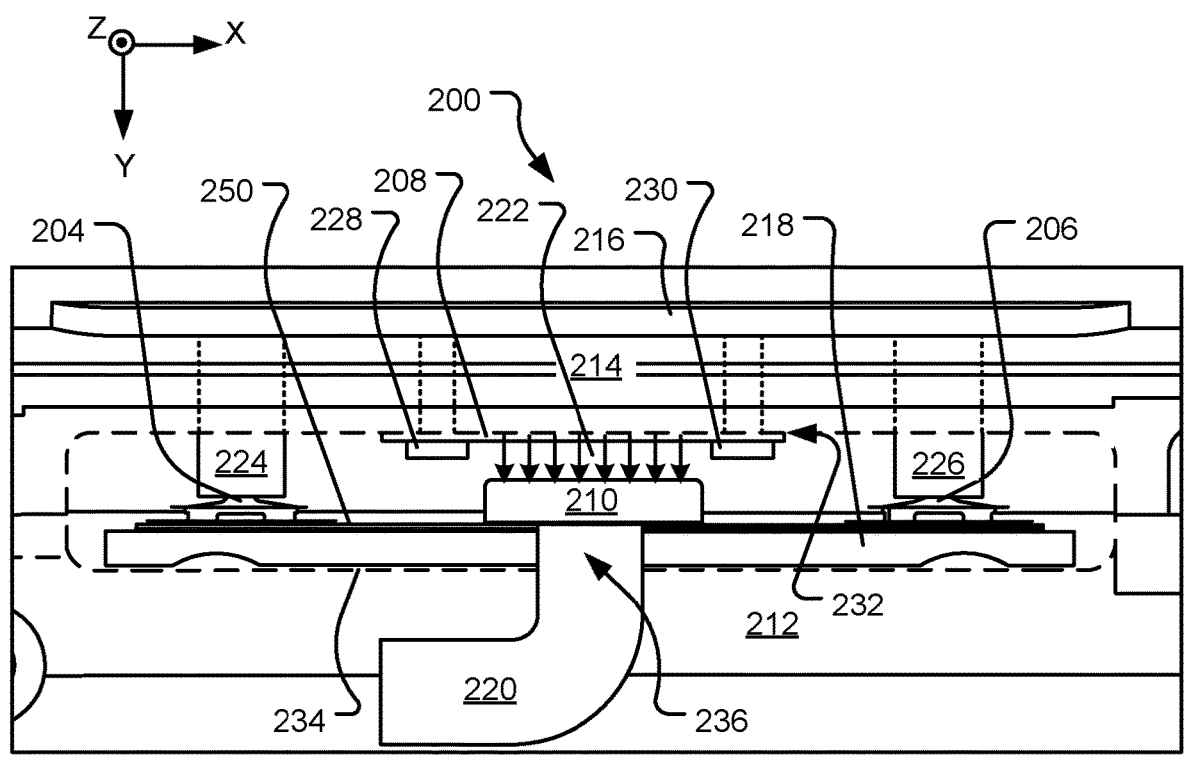
FIG. 2 illustrates an elevation view of an example magnetically preloaded push button.

FIG. 2 illustrates an elevation view of an example magnetically preloaded push button 200. XYZ coordinates are provided in FIG. 2 to aid the detailed description, but do not limit the scope of the presently disclosed technology. The push button 200 is generally mounted within a chassis 212, specifically illustrated as a button cap 216 having two button posts 224, 226 extending through a wall 214 of the chassis 212 to meet dome switches 204, 206, respectively. The chassis 212 may be that of any computing device or input device for a computing device.

A top side of the button cap 216 serves as the interface for a user to apply pressure to the push button 200 to selectively actuate one or both of the dome switches 204, 206. The button posts 224, 226 extend from a bottom side of the button cap 216 and slip-fit through corresponding button post apertures in the wall 214 of the chassis 212, though the button post apertures are not explicitly shown. The button posts 224, 226 are for actuation of the dome switches 204, 206, respectively. Similarly, retainer posts 228, 230 extend from the bottom side of the button cap 216 and slip-fit through corresponding retainer post apertures in the wall 214 of the chassis 212, though the retainer post apertures are not explicitly shown. The retainer posts 228, 230 are for securing the button cap 216 in position with reference to the chassis 212 in an X-Z plane. In some implementations, the wall 214 of the chassis 212 includes a singular aperture or shared apertures that accommodates the button posts 224, 226 and the retainer posts 228, 230 rather than the illustrated separate apertures. In this configuration, the button cap 216 may be inserted into the chassis 212 from outside of the wall 214 during device assembly.

A key retainer 208 (e.g., one or more c-clips or a master link clip) is secured to the distal ends of the retainer posts 228, 230, thereby limiting travel of the button cap 216 in the negative y-direction and preventing the button cap 216 from being inadvertently removed from the chassis 212 (e.g., during a drop event where forces on the button cap 216 may exceed the preload force discussed in detail below). The key retainer 208 is made of a magnetically "soft" ferromagnetic material (e.g., iron, cobalt, nickel, and alloys thereof). In other implementations, the key retainer 208 is not ferromagnetic itself, but includes a ferromagnetic target attached thereto for the purpose of providing the force of attraction to preload magnet 210, discussed below.

A dome switch bracket 218 attaches to and spans a distance within the chassis 212 below the button cap 216. A flexible printed circuit (FPC) or push button printed circuit board (PCB), collectively printed circuit 250 is mounted to the dome switch bracket 218 and controls operation of the push button 200, including but not limited to electronically transmitting depression(s) and release(s) of the push button 200 to an associated computing device via ribbon cable 220. The dome switches 204, 206 are mounted on the dome switch bracket 218 so that the dome switches 204, 206 are centered underneath the button posts 224, 226, respectively.

Preload magnet 210 is also mounted on the push button printed circuit 250 or directly to the dome switch bracket 218. Mounting the preload magnet 210 to the push button printed circuit may be technically advantageous in that it permits the push button printed circuit 250 to be manufactured in a singular unit, including the preload magnet 210. On the other hand, mounting the preload magnet 210 to the dome switch bracket 218 may be technically advantageous when the preload magnet 210 is intended to be attached at a different point in the push button 200 manufacturing process. The preload magnet 210 is made of a magnetically "hard" ferromagnetic material, such as alnico or processed ferrite. The preload magnet 210 applies force of attraction 222 on the magnetically "soft" ferromagnetic key retainer 208. In other implementations, multiple preload magnets may be distributed across the printed circuit 250 to spread out the force of attraction 222 on the button cap 216. In another implementation, the key retainer 208 is made of a magnetically "hard" ferromagnetic material and the preload magnet 210 is made of a magnetically "soft" ferromagnetic material.

The force of attraction 222 biases the key retainer 208 toward the preload magnet 210, thereby preloading the dome switches 204, 206 by pulling the button posts 224, 226, respectively, downward onto the dome switches 204, 206. In another implementation, the preload magnet 210 is mounted to the key retainer 208 instead of the dome switch bracket 218 and a second preload magnet (not shown, see e.g., preload magnet 342 of FIG. 3) is mounted to a bottom side of the button cap 216. The poles of the pairing of preload magnets are oriented such that the magnets repel one another, thereby biasing the key retainer 208 toward the dome switch bracket 218 and preloading the dome switches 204, 206.

The force of attraction 222 is calibrated to automatically provide a desired preload force on the dome switches 204, 206 (e.g., 1-2 Newtons) to achieve a predictable and consistent positive tactile feedback to a user of the push button 200 when the push button 200 depressed and released. The force of attraction 222 causes a nominal tolerance gap 232 to open between the key retainer 208 and an inside surface of the wall 214 of the chassis 212. The tolerance gap 232 may vary slightly due to manufacturing variances from computing device to computing device. However, as the dome switches 204, 206 are automatically preloaded with the predictable and consistent positive tactile feedback, variation in the tolerance gap 232 does not substantially affect the positive tactile feedback to the user of the push button 200.

In various implementations, utilization of the dome switch bracket 218 provides a technical benefit of allowing the push button printed circuit 250, the ribbon cable 220, the dome switches 204, 206, and the preload magnet 210 capable of installation as a singular unit for preloading the push button 200. A bottom side of the dome switch bracket 218 may have a cable aperture 236 through which the ribbon cable 220 extends from the printed circuit 250 to an electrotonic connection (not shown) within the device chassis 212. The dome switch bracket 218 may be secured to and sealed against the device chassis 212 and the cable aperture 236 may be sealed around the ribbon cable 220 to meet the IPX5 or IPX6 in solid particle protection and IPX7 or IPX8 in in liquid ingress protection around and through the dome switch bracket 218. Alternatively or additionally, a sealing plate with plastic or rubber gasket or overmold may be applied over the dome switch bracket 218 to seal it against the device chassis 212.

Use of the dome switch bracket 218 is an improvement in manufacturability of the push button 200 as these components installed as a singular unit is less complex and time consuming than installing similar components separately into the computing device. Further, this is an improvement in field repair as these components may be replaced as a singular replacement unit (rather than individually and separately), and without any dedicated machines to set the preload on the dome switches 204, 206, as is often the case in the prior art.

In some implementations, a push button pocket 234 (illustrated by dashed box) is formed in the device chassis 212 specifically to receive components of the push button 200. The push button pocket 234 may be sealed to the device chassis 212 so that while the push button pocket 234 may be infiltrated by dirt, dust, and/or water through the aperture(s) for the button posts 224, 226 and/or the retainer posts 228, 230, the remainder of the device chassis 212 is sealed from the infiltration. In various implementations, the push button pocket 234 may be sealed to meet the IPX5 or IPX6 in solid particle protection and IPX7 or IPX8 in in liquid ingress protection. Such sealing is technically advantageous as it permits the push button 200 to freely actuate within the push button pocket 234, but still allows the associated device to achieve a desired level of sealing.

In other implementations, a singular button post and dome switch is centered underneath the button cap 216 operating as discussed above. A singular retainer post may also function similarly in such a push button. Other implementations may include more than two button post and dome switch pairings and/or more than two retainer posts, still with similar functionality. Larger push buttons may utilize more button post and dome switch pairings and retainer posts, while smaller push buttons may utilize fewer button post and dome switch pairings and retainer posts, down to one of each component. Generally, a minimum of button post and dome switch pairings and retainer posts is technically advantageous as it minimizes push button 200 overall complexity. However, for larger push buttons, more button post and dome switch pairings and retainer posts is technically advantageous as it provides a more consistent tactile feedback across the surface area of the button cap 216 where the user interfaces with it.

In the event of a drop event where the push button 200 is substantially overloaded past its design parameters, one or both of dome switches 204, 206 may fully collapse (or over collapse). This may cause the force of attraction 222 to be too great to permit the over collapsed dome switch(es) to rebound due to the reduced distance between the preload magnet 210 and the key retainer 208 caused by the over collapse of the dome switch(es). To mitigate the risk of overloading the push button 200 and having dome switch (es) that fail to rebound, the dome switch bracket 218 may be designed to be substantially rigid under expected loading conditions, but flex when overloaded to absorb some of the overload force (and perhaps prevent over collapse of the dome switch(es)). In addition, a spacer oriented adjacent dome switch(es) and below the button posts 224, 226 may be used to absorb some of the overload force as well.

In various implementations, a push button 200 thickness specification may be less than 5.0 mm between the dome switch bracket 218 and a top side (user interface surface) of the button cap 216. Further, the push button 200 have between 0.15 mm and 0.30 mm (or approximately 0.2 mm) of physical travel or stroke to offer the user a perceptible physical travel and positive tactile feedback. In various implementations, the push button 200 is utilized as a power or volume buttons for the computing device or input device for the computing device. Further, the push button 200 may also be utilized as a fingerprint reader for granting access to the computing device.

Figure 3:
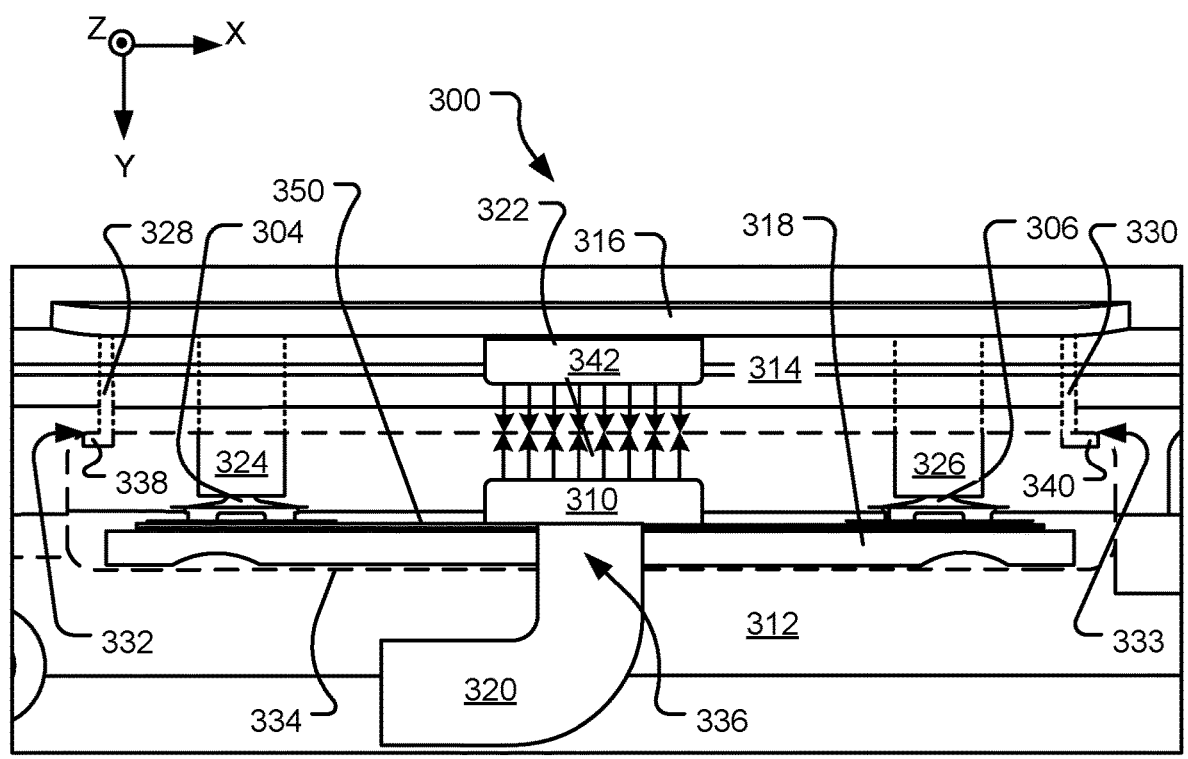
FIG. 3 illustrates an elevation view of another example magnetically preloaded push button.

FIG. 3 illustrates an elevation view of another example magnetically preloaded push button 300. XYZ coordinates are provided in FIG. 3 to aid the detailed description, but do not limit the scope of the presently disclosed technology. The push button 300 is generally mounted within a chassis 312, specifically illustrated as a button cap 316 having two button posts 324, 326 extending through a wall 314 of the chassis 312 to meet dome switches 304, 306, respectively. The chassis 312 may be that of any computing device or input device for a computing device.

A top side of the button cap 316 serves as the interface for a user to apply pressure to the push button 300 to selectively actuate one or both of the dome switches 304, 306. The button posts 324, 326 extend from a bottom side of the button cap 316 and slip-fit through corresponding button post apertures in the wall 314 of the chassis 312, though the button post apertures are not explicitly shown. The button posts 324, 326 are for actuation of the dome switches 304, 306, respectively. The button cap 316 further includes a cap preload magnet 342 mounted on the bottom side of the button cap 316. The cap preload magnet 342 is made of a magnetically "hard" ferromagnetic material.

Retainer posts 328, 330 also extend from the bottom side of the button cap 316 and slip-fit through corresponding retainer post apertures in the wall 314 of the chassis 312, though the retainer post apertures are not explicitly shown. The retainer posts 328, 330 are for securing the button cap 316 in position with reference to the chassis 312 in an X-Z plane. In this configuration, the aperture in the wall 314 of the chassis 312 is sized such that the button cap 316 may be slip fit through the aperture from inside of the wall 314 during device assembly. Retaining flanges 338, 340 are secured to the distal ends of the retainer posts 328, 330 and seated against the wall 314, thereby limiting travel of the button cap 316 in the negative y-direction and preventing the button cap 316 from being inadvertently removed from the chassis 312. In some implementations, the retaining flanges 338, 340 are collectively a singular flanged structure that extends about the entire perimeter of the button cap 316 within the chassis 312.

A dome switch bracket 318 attaches to and spans a distance within the chassis 312 below the button cap 316. A flexible printed circuit (FPC) or push button printed circuit board (PCB), collectively printed circuit 350 is mounted to the dome switch bracket 318 and controls operation of the push button 300, including but not limited to electronically transmitting depression(s) and release(s) of the push button 300 to an associated computing device via ribbon cable 320. The dome switches 304, 306 are mounted on the dome switch bracket 318 so that the dome switches 304, 306 are centered underneath the button posts 324, 326, respectively.

Bracket preload magnet 310 is also mounted on the push button printed circuit 350 or directly to the dome switch bracket 318. The bracket preload magnet 310 is made of a magnetically "hard" ferromagnetic material. The poles of the cap preload magnet 342 and the bracket preload magnet 310 are oriented such that the magnets 342, 310 apply force of attraction 322 to each other. In other implementations, multiple pairings of preload magnets may be distributed across the printed circuit 350 to spread out the force of attraction 322 on the button cap 316.

In other implementations, one of magnets 342, 310 is made of a magnetically "soft" ferromagnetic material (e.g., it is a ferromagnetic target) and the other of the magnets 342, 310 applies the force of attraction 322. In another implementation, the button cap 316 is of a magnetically "soft" ferromagnetic material and the cap preload magnet 342 is omitted. In yet another implementation, the dome switch bracket 318 is of a magnetically "soft" ferromagnetic material and the bracket preload magnet 310 is omitted.

The force of attraction 322 biases the button cap 316 toward the dome switch bracket 318, thereby preloading the dome switches 304, 306 by pulling the button posts 324, 326, respectively, downward onto the dome switches 304, 306. The force of attraction 322 is calibrated to automatically provide a desired preload force on the dome switches 304, 306 to achieve a predictable and consistent positive tactile feedback to a user of the push button 300 when the push button 300 depressed and released.

The force of attraction 322 causes nominal tolerance gaps 332, 333 to open between the retaining flanges 338, 340, respectively, and an inside surface of the wall 314 of the chassis 312. The tolerance gaps 332, 333 may vary slightly due to manufacturing variances from computing device to computing device. However, as the dome switches 304, 306 are automatically preloaded with the predictable and consistent positive tactile feedback, variation in the tolerance gaps 332, 333 does not substantially affect the positive tactile feedback to the user of the push button 300.

In various implementations, utilization of the dome switch bracket 318 provides a technical benefit of allowing the push button printed circuit 350, the ribbon cable 320, the dome switches 304, 306, and the preload magnet 310 capable of installation as a singular unit for preloading the push button 300. A bottom side of the dome switch bracket 318 may have a cable aperture 336 through which the ribbon cable 320 extends from the printed circuit 350 to an electrotonic connection (not shown) within the device chassis 312. The dome switch bracket 318 may be secured to and sealed against the device chassis 312 and the cable aperture 336 may be sealed around the ribbon cable 320. Alternatively or additionally, a sealing plate with plastic or rubber gasket or overmold may be applied over the dome switch bracket 318 to seal it against the device chassis 312. Running the ribbon cable 320 through the cable aperture 336 in the bottom side of the dome switch bracket 318 may be technically advantageous in that it allows the ribbon cable 320 to be electrically connected to the within the device chassis 312, and then the dome switch bracket 318 subsequently sealed against the device chassis 312, thereby simplifying device construction.

In some implementations, a push button pocket 334 (illustrated by dashed box) is formed in the device chassis 312 specifically to receive components of the push button 300. The push button pocket 334 may be sealed to the device chassis 312 so that while the push button pocket 334 may be infiltrated by dirt, dust, and/or water through the aperture for the button cap 316, the remainder of the device chassis 312 is sealed from the infiltration.

In other implementations, features illustrated and described above with reference to FIGS. 1-3 may be used in different combinations than that explicitly shown in each of FIGS. 1-3 and described with specific reference to each of FIGS. 1-3.

Figure 4:
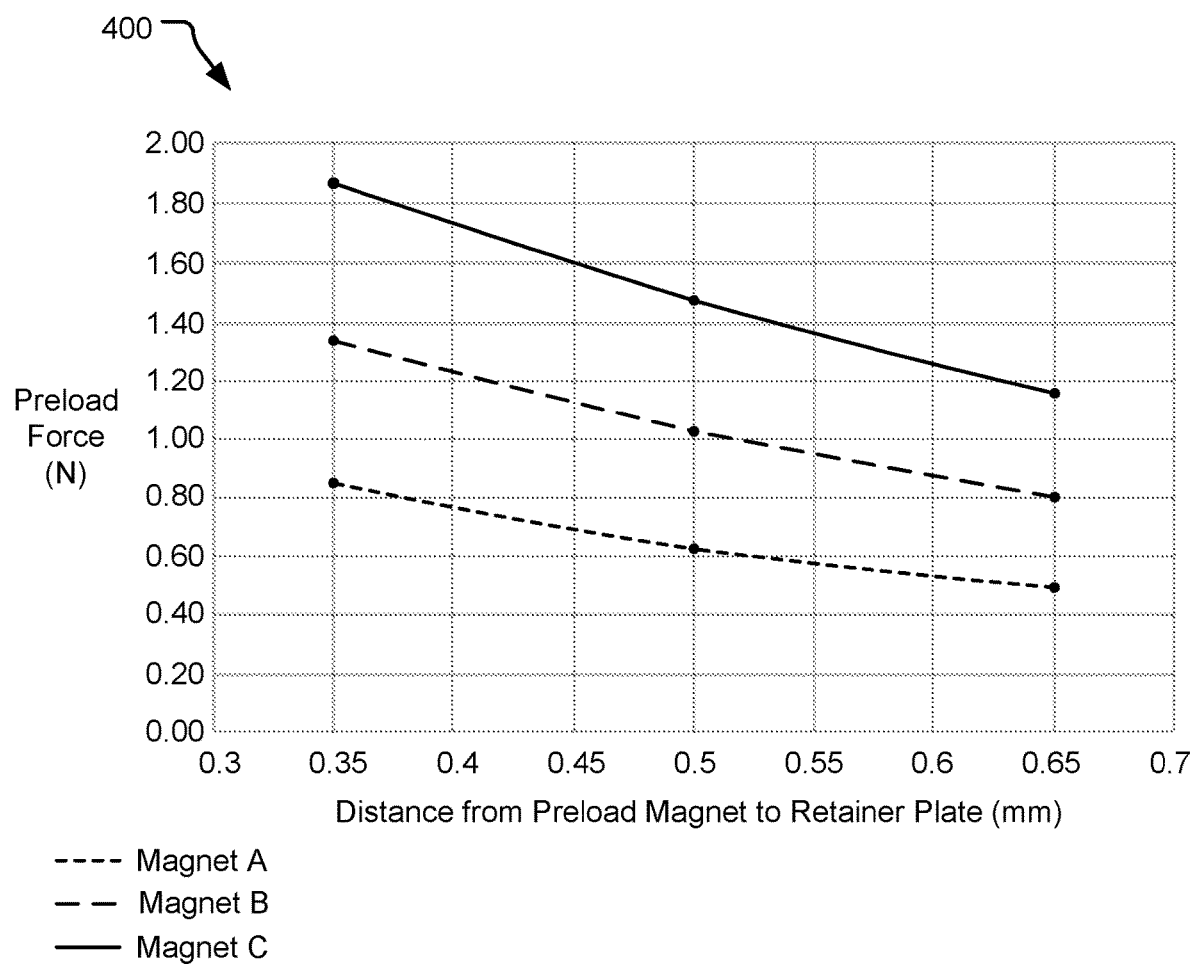
FIG. 4 illustrates an example chart of preload force magnitude as a function of distance for a magnetically preloaded push button.

FIG. 4 illustrates an example chart 400 of preload force magnitude as a function of distance for a magnetically preloaded push button. The chart 400 assumes a physical configuration as illustrated in FIG. 2, however, other physical configuration may yield similar results. The chart 400 further assumes use of a N52 preload magnet that is 2.8 mm high by 5 mm wide. The magnet has the following three different potential thicknesses for comparison purposes: Magnet A (short-dash line) is 1.0 mm thick; Magnet B (long-dash line) is 1.5 mm thick; and Magnet C (solid line) is 2.0 mm thick. The chart 400 still further assumes a target 1 Newton preload force applied at a 0.5 mm target distance between the preload Magnet and a retainer plate target. The chart 400 is merely an example as other physical configurations, magnet types and dimensions, as well as target preload forces and target distances from the preload magnet to the retainer plate are contemplated here.

Magnet B (long-dash line) yields approximately the target 1N preload force near the middle of its target distance range. As FIG. 4 illustrates a range of target distances based on potential variation due to manufacturing tolerances, the Magnet B yields an approximately 0.80-1.35N preload force ranging between an approximately 0.65-0.35 mm target distance. If a smaller preload force is desired, Magnet A (short-dash line) yields approximately 0.6N preload force near the middle of its target distance range. If a greater preload force is desired, Magnet C (solid line) yields approximately 1.5N preload force near the middle of its target distance range. The disclosed preload force and target distance ranges are within that generally expected in computing device push buttons, which is technically advantageous in that the magnetically preloaded push buttons disclosed herein can provide similar positive tactile feedback as conventional designs, but with a fewer device part count and less manufacturing complexity.

Figure 5:
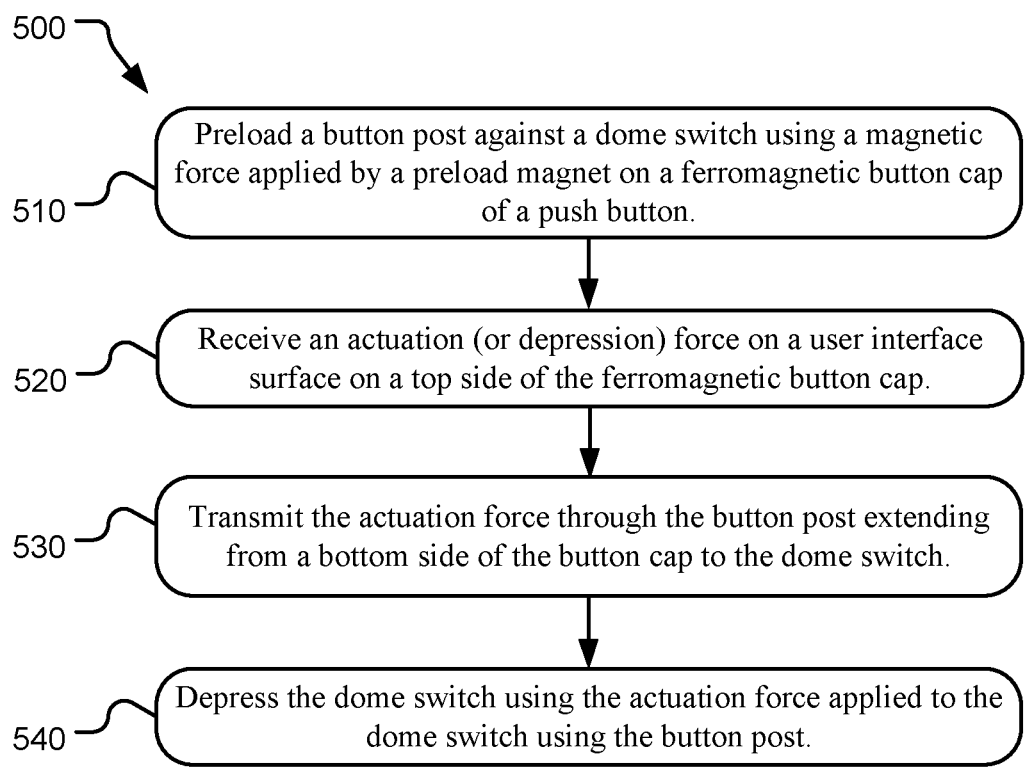
FIG. 5 illustrates example operations for using a magnetically preloaded push button.

FIG. 5 illustrates example operations 500 for using a magnetically preloaded push button. In various implementations, the push button is incorporated as a component of a computing device, which may different physical features and arrangements (e.g., a power or volume button on a smart device or a key on a keyboard). A dome switch provides electric or electronic signals indicating when the push button has been depressed and released. A preloading operation 510 preloads a button post against the dome switch using a magnetic force applied by a preload magnet on a ferromagnetic button cap of the push button. The preloading operation 510 takes up any gap or looseness that would otherwise exist due to manufacturing tolerances between the button post and the dome switch. Other implementations may incorporate multiple pairings of dome switches and button posts.

A receiving operation 520 receives an actuation (or depression) force on a user interface surface on a top side of the ferromagnetic button cap. A user applies the actuation force by pressing on the user interface surface of the ferromagnetic button cap. A transmitting operation 530 transmits the actuation force through the button post extending from a bottom side of the button cap to the dome switch. The button post extends through a button aperture in a device chassis of a corresponding computing device and contacts the dome switch. The button post/button aperture combination is technically advantageous in that it secures the button cap in all directions with the exception of the linear axis along which the magnetically preloaded push button is actuated and released. In various implementations, a key retainer or retaining flange is included that further provides a technical benefit of preventing the button cap from exiting the corresponding computing device in an opposite direction from the applied actuation force.

A depressing operation 540 depresses the dome switch using the actuation force applied to the dome switch using the button post. As a result of the preloading operation 510, the dome switch provides a predictable and consistent positive tactile feedback to the user when the magnetically preloaded push button is depressed.

The operations making up the embodiments of the invention described herein are referred to variously as operations, steps, objects, or modules. Furthermore, the operations may be performed in any order, adding or omitting operations as desired, unless explicitly claimed otherwise or a specific order is inherently necessitated by the claim language.

In various implementations, the dimensions provided herein are approximate and defined as +/−10%. Dimensions provided herein and described as "substantially" is defined as within expected manufacturing tolerances for the disclosed art. In other implementations (e.g., large travel push buttons), the provided dimensions may have proportionally greater values than that specifically defined. Further, other dimensions than those specifically provided are contemplated herein.

Example implementations disclosed herein include an computing device comprising: a device chassis including a button aperture; a push button including: a button cap including: a user interface surface on a top side of the button cap; a button post extending from a bottom side of the button cap, the button post extending through the button aperture; a retainer post also extending from the bottom side of the button cap, the retainer post extending through the button aperture; and a ferromagnetic key retainer attached to a distal end of the retainer post that limits travel of the button cap out of the device chassis; a dome switch mounted within the device chassis; and a preload magnet that biases the button post against the dome switch by magnetic force with the ferromagnetic key retainer.

In further example implementations disclosed herein, the ferromagnetic key retainer is of a ferromagnetic material or includes a ferromagnetic target attached thereto.

In further example implementations disclosed herein, the push button further includes: a switch bracket mounted within the device chassis, wherein a printed circuit including the dome switch and the preload magnet is mounted to the switch bracket.

Example implementations disclosed herein further comprise: a sealed push button pocket in the device chassis, wherein the switch bracket mounted within the sealed push button pocket and the button cap extends into the sealed push button pocket.

In further example implementations disclosed herein, a ribbon cable extends from the printed circuit through an aperture in the switch bracket.

In further example implementations disclosed herein, the ferromagnetic key retainer is attracted to the preload magnet.

In further example implementations disclosed herein, the preload magnet is mounted to the device chassis between the device chassis and the ferromagnetic key retainer, and the ferromagnetic key retainer is repelled by the preload magnet.

In further example implementations disclosed herein, the button aperture includes a button post aperture and a retainer post aperture, wherein the button post extends through the button post aperture and the retainer post extends through the retainer post aperture.

In further example implementations disclosed herein, the bias against the dome switch applies a preload force of 1-2 Newtons.

In further example implementations disclosed herein, the button cap further includes: multiple button posts extending from the bottom side of the button cap and through the button aperture; and multiple retainer posts also extending from the bottom side of the button cap and through the button aperture, the push button further comprising: multiple dome switches mounted within the device chassis, wherein the preload magnet biases each of the button posts against one of the dome switches by the magnetic force with the ferromagnetic key retainer.

Example implementations disclosed herein include a computing device comprising: a device chassis including a button aperture; a push button including: a ferromagnetic button cap extending through the button aperture including: a user interface surface on a top side of the button cap; a button post extending from a bottom side of the button cap; and a dome switch mounted to the device chassis; and a preload magnet that biases the button post against the dome switch by magnetic force with the ferromagnetic button cap.

In further example implementations disclosed herein, the ferromagnetic button cap is of a ferromagnetic material or includes a ferromagnetic target attached thereto.

In further example implementations disclosed herein, the ferromagnetic button cap includes a retaining flange on the bottom side of the button cap, the retaining flange to limit travel of the ferromagnetic button cap out of the device chassis.

In further example implementations disclosed herein, the push button further includes: a switch bracket mounted within the device chassis, wherein a printed circuit including the dome switch and the preload magnet is mounted to the switch bracket.

Example implementations disclosed herein further comprise: a sealed push button pocket in the device chassis, wherein the switch bracket mounted within the sealed push button pocket and the ferromagnetic button cap extends into the sealed push button pocket.

In further example implementations disclosed herein, a flexible cable extends from the printed circuit through an aperture in the switch bracket.

In further example implementations disclosed herein, the ferromagnetic button cap is attracted to the preload magnet.

In further example implementations disclosed herein, the ferromagnetic button cap includes multiple button posts extending from the bottom side of the ferromagnetic button cap and through the button aperture, the push button further comprising: multiple dome switches mounted within the device chassis, wherein the preload magnet biases each of the button posts against one of the dome switches by the magnetic force with the ferromagnetic button cap.

In further example implementations disclosed herein, the bias against the dome switch applies a preload force of 1-2 Newtons.

Example implementations disclosed herein include a method of actuating a magnetically preloaded push button comprising: preloading a button post against a dome switch using a magnetic force applied by a preload magnet on a ferromagnetic button cap of the push button; receiving an actuation force on a user interface surface on a top side of the ferromagnetic button cap; transmitting the actuation force through the button post extending from a bottom side of the ferromagnetic button cap, the button post extending through a button aperture in a device chassis and contacting the dome switch; and depressing the dome switch using the actuation force applied to the dome switch using the button post.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device comprising:
   a device chassis including a button aperture;
   a push button including:
   a button cap including:
   a user interface surface on a top side of the button cap;
   a button post extending from a bottom side of the button cap, the button post extending through the button aperture;
   a retainer post also extending from the bottom side of the button cap, the retainer post extending through the button aperture; and
   a ferromagnetic key retainer attached to a distal end of the retainer post that limits travel of the button cap out of the device chassis;
   a dome switch mounted within the device chassis; and
   a preload magnet that biases the button post against the dome switch by magnetic force with the ferromagnetic key retainer.

2. The computing device of claim 1, wherein the ferromagnetic key retainer is of a ferromagnetic material or includes a ferromagnetic target attached thereto.

3. The computing device of claim 1, wherein the push button further includes:
   a switch bracket mounted within the device chassis, wherein a printed circuit including the dome switch and the preload magnet is mounted to the switch bracket.

4. The computing device of claim 3, further comprising:
a sealed push button pocket in the device chassis, wherein the switch bracket mounted within the sealed push button pocket and the button cap extends into the sealed push button pocket.

5. The computing device of claim 3, wherein a ribbon cable extends from the printed circuit through an aperture in the switch bracket.

6. The computing device of claim 1, wherein the ferromagnetic key retainer is attracted to the preload magnet.

7. The computing device of claim 1, wherein the preload magnet is mounted to the device chassis between the device chassis and the ferromagnetic key retainer, and the ferromagnetic key retainer is repelled by the preload magnet.

8. The computing device of claim 1, wherein the button aperture includes a button post aperture and a retainer post aperture, wherein the button post extends through the button post aperture and the retainer post extends through the retainer post aperture.

9. The computing device of claim 1, wherein the bias against the dome switch applies a preload force of 1-2 Newtons.

10. The computing device of claim 1, wherein the button cap further includes:
multiple button posts extending from the bottom side of the button cap and through the button aperture; and
multiple retainer posts also extending from the bottom side of the button cap and through the button aperture, the push button further comprising:
multiple dome switches mounted within the device chassis, wherein the preload magnet biases each of the button posts against one of the dome switches by the magnetic force with the ferromagnetic key retainer.

11. A computing device comprising:
a device chassis including a button aperture;
a push button including:
a ferromagnetic button cap extending through the button aperture including:
a user interface surface on a top side of the button cap;
a button post extending from a bottom side of the button cap; and
a dome switch mounted to the device chassis; and
a preload magnet that biases the button post against the dome switch by magnetic force with the ferromagnetic button cap.

12. The computing device of claim 11, wherein the ferromagnetic button cap is of a ferromagnetic material or includes a ferromagnetic target attached thereto.

13. The computing device of claim 11, wherein the ferromagnetic button cap includes a retaining flange on the bottom side of the button cap, the retaining flange to limit travel of the ferromagnetic button cap out of the device chassis.

14. The computing device of claim 11, wherein the push button further includes:
a switch bracket mounted within the device chassis, wherein a printed circuit including the dome switch and the preload magnet is mounted to the switch bracket.

15. The computing device of claim 14, further comprising:
a sealed push button pocket in the device chassis, wherein the switch bracket mounted within the sealed push button pocket and the ferromagnetic button cap extends into the sealed push button pocket.

16. The computing device of claim 14, wherein a flexible cable extends from the printed circuit through an aperture in the switch bracket.

17. The computing device of claim 11, wherein the ferromagnetic button cap is attracted to the preload magnet.

18. The computing device of claim 11, wherein the ferromagnetic button cap includes multiple button posts extending from the bottom side of the ferromagnetic button cap and through the button aperture, the push button further comprising:
multiple dome switches mounted within the device chassis, wherein the preload magnet biases each of the button posts against one of the dome switches by the magnetic force with the ferromagnetic button cap.

19. The computing device of claim 11, wherein the bias against the dome switch applies a preload force of 1-2 Newtons.

20. A method of actuating a magnetically preloaded push button comprising:
preloading a button post against a dome switch using a magnetic force applied by a preload magnet on a ferromagnetic button cap of the push button;
receiving an actuation force on a user interface surface on a top side of the ferromagnetic button cap;
transmitting the actuation force through the button post extending from a bottom side of the ferromagnetic button cap, the button post extending through a button aperture in a device chassis and contacting the dome switch; and
depressing the dome switch using the actuation force applied to the dome switch using the button post.

* * * * *